Aug. 9, 1927.  
S. MOORE ET AL  
1,638,450  
HEADLIGHT  
Filed July 30, 1926  
2 Sheets-Sheet 1

Inventors  
Samuel Moore  
Fred O. Sheets  
By Lacey & Lacey, Attorneys

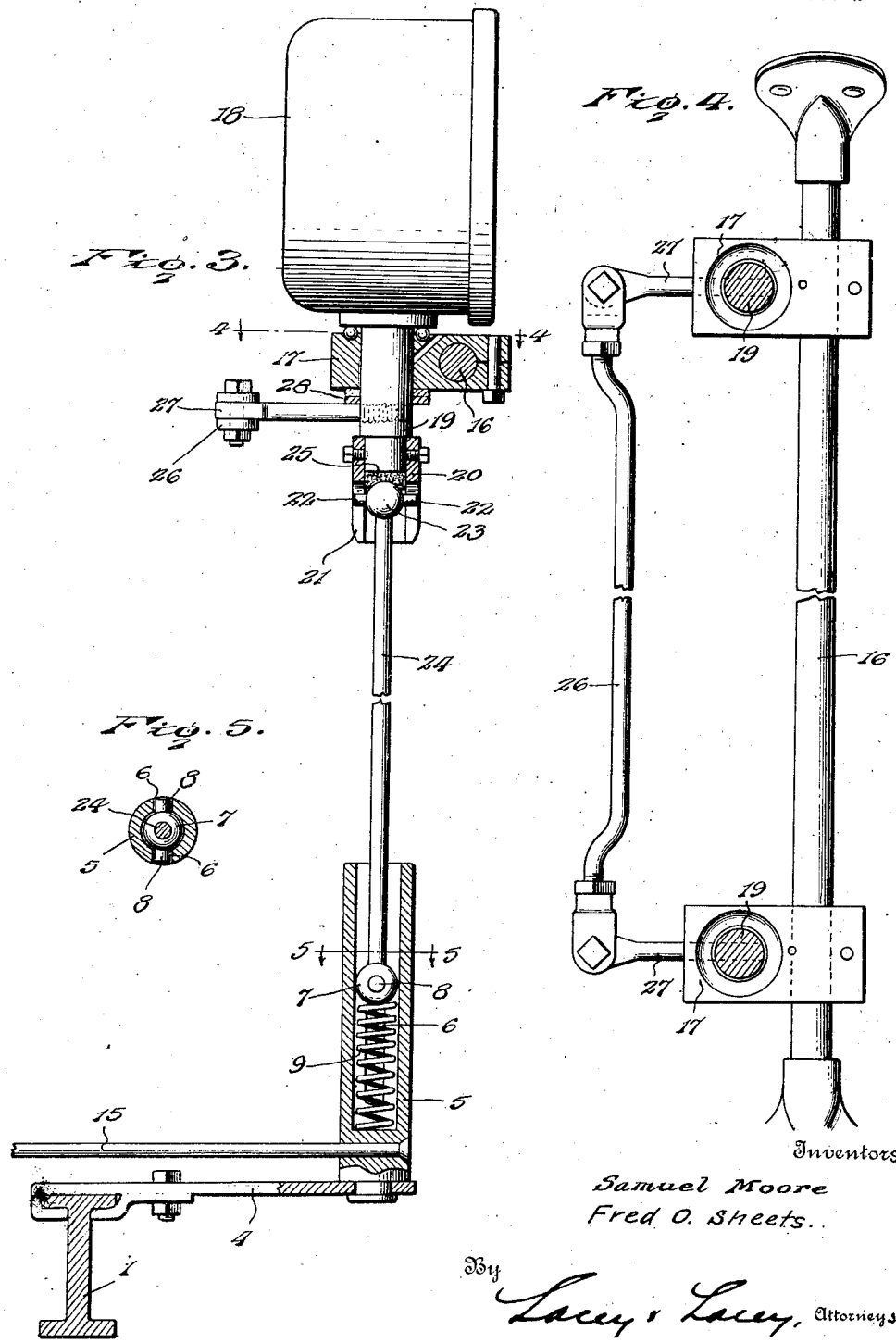

Patented Aug. 9, 1927.

1,638,450

UNITED STATES PATENT OFFICE.

SAMUEL MOORE AND FRED O. SHEETS, OF FAIRMONT, WEST VIRGINIA, ASSIGNORS, BY DIRECT AND MESNE ASSIGNMENTS, OF PART INTEREST TO DANIEL SCRUGGS, CLYDE MORGAN, JOSEPH GORHAM, AND ROBERT THOMPSON, ALL OF FAIRMONT, WEST VIRGINIA, H. L. KUHN, OF SHINNSTON, WEST VIRGINIA, SAID FRED O. SHEETS, SAID SAMUEL MOORE AND WILLIAM M. KEENER, OF FAIRMONT, WEST VIRGNNIA.

HEADLIGHT.

Application filed July 30, 1926. Serial No. 125,993.

Automobiles and motor vehicles generally equipped with the usual fixed headlights oftentimes meet with casualties which are attributable to insufficient illumination of the roadway after dark, particularly when negotiating a curve or making a turn, since only a part of the road is lighted.

This invention contemplates pivotally mounting the headlights and connecting them with the steering gear of the vehicle, so that when the steering wheels are turned in either direction to depart from a direct course, as when traveling on a curve or making a turn, the headlights will move simultaneously in the same direction to throw the rays of light to illuminate the roadway ahead of the vehicle, thereby preventing the machine from running into a ditch, or colliding with an object, as frequently happens when the road is not properly or sufficiently lighted.

The invention provides novel mounts for the headlights and simple and positive connections between the headlights and the steering gear which obviate rattle and readily conform to the various movements between the body and chassis to wholly overcome any binding tendency between the parts, thereby assuring a freedom of movement with a positive and certain action.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attach, in which—

Figure 3 is a diagrammatic sectional view showing the parts on a larger scale.

Figure 4 is a detail sectional view on the line 4—4 of Figure 3.

Figure 5 is a detail sectional view on the line 5—5 of Figure 3, and

Corresponding and like parts are referred to in the following description and designated in the several views of the drawings by like reference characters.

Figure 1:
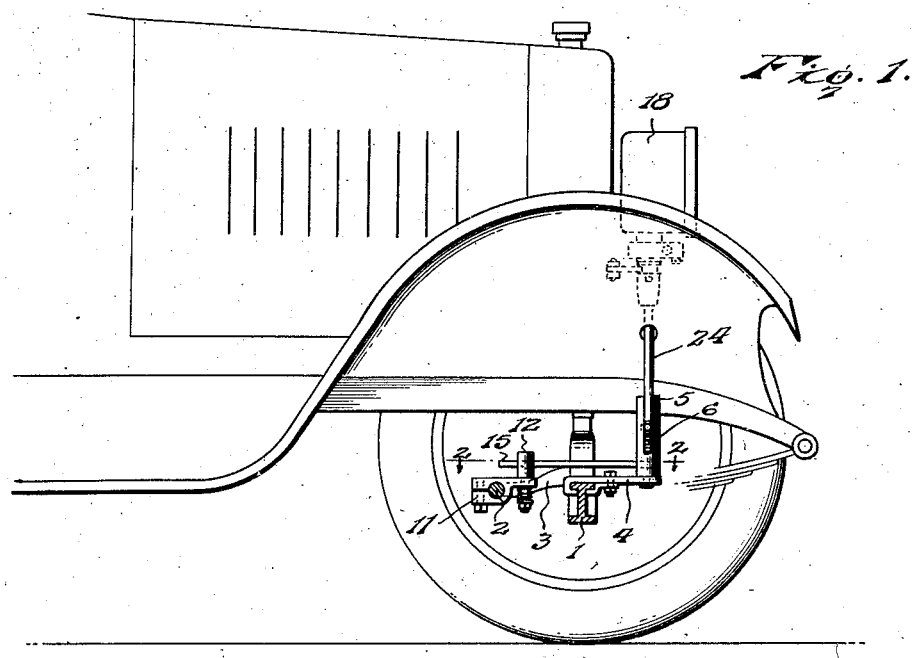
Figure 1 is a side view of the front portion of a motor vehicle equipped with headlights embodying the invention, the near wheel being removed and the axle and drag link being in section, to show more clearly the connection.
Figure 2:
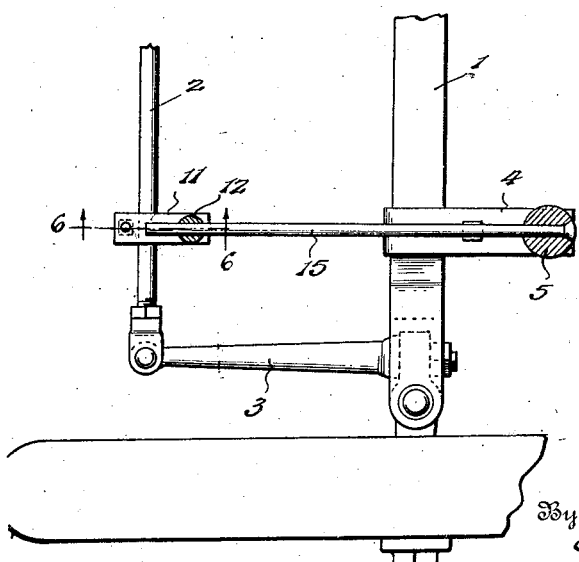
Figure 2 is an enlarged detail sectional view on the line 2—2 of Figure 1.
Figure 6:
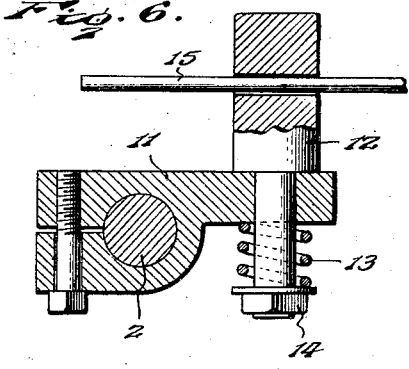
Figure 6 is an enlarged detail sectional view on the line 6—6 of Figure 2.

The numeral 1 designates the front axle of a motor vehicle, and 2 the usual drag link connecting the arms 3 of the steering knuckles. These parts may be of any well known construction and arrangement. In accordance with the invention a bracket 4 is clamped, or otherwise secured at one end to the axle 1, and projects forwardly and pivotally supports a tubular standard 5 in opposite sides of which are formed slots 6. A ball 7 is yieldably mounted within the tubular standard 5 and is provided with oppositely disposed trunnions 8 which extend into the slots 6 and direct the ball in its vertical movements. An open helical spring 9 is disposed within the tubular standard 5 and exerts an upward pressure upon the ball 7. A lug 11 is clamped, or otherwise secured to the drag link 2 and pivotally supports a pin 12. The stem of the pin 12 is mounted in the lug 11 to turn freely and its lower end receives a helical spring 13 and nut 14 whereby the head of the pin 12 is maintained in close contact with the lug 11. A rod 15 is secured at its forward end to the tubular standard 5 and passes loosely through a transverse opening formed in the head of the pin 12, and in this manner provision is had for movement of the drag link 2 incident to steering without producing any binding action. It will also be understood that movement of the drag link 2 transversely of the vehicle results in a corresponding movement of the rear end of the rod 15 and a turning of the tubular standard 5.

The numeral 16 designates the brace generally provided for connecting the front fenders forwardly of the radiator and, in the present instance, lugs 17 are mounted thereon and may be clamped or otherwise secured thereto. The lugs 17 pivotally support the lamps 18 which are provided with depending stems 19 mounted in vertical openings formed in the lugs 17 and having sleeves 20 secured to their lower ends. Slots 21 are formed in opposite sides of each of the sleeves 20 and receive trunnions 22 projecting from a ball 23 at diametrically opposite points. A rod 24 connects the upper ball 23 with the lower ball 7 and these balls may form a part of the rod or may be applied thereto in any determinate way. A packing 25 is interposed between the ball 23 and the lower end of the stem 19 and serves to deaden noise and prevent any pounding action. The spring 9 normally holds the ball 23 in contact with the packing 25. The arrangement is such as to admit of the rod 24 having a limited movement in every direction without producing any binding contact with either the sleeve 20 or the tubular standard 5. A link 26 has adjustable connection with arms 27 projecting from the stems 19 and in this way a turning movement imparted to one of the lamps 18 is transmitted to the companion lamp, so that both of the lamps turn in unison.

The arms 27 are threaded into openings formed in the projecting ends of the stems 19 and serve to hold said stems in the openings formed in the lugs 17. Washers 28 are interposed between the lugs 17 and the arms 27 to prevent any vertical play of the stems, as will be readily understood.

It will be readily understood from the foregoing taken in connection with the accompanying drawings, that the invention may be readily adapted to any make of automobile or motor vehicle, since the bracket 4 may be of any design and secured to the front axle in any determinate way as also the lug 11 which may be mounted upon the drag link or like part connecting the arms of the steering knuckles. The lamps 18 may be mounted in any convenient way to admit of their pivotal movement and the connection 24 maintains a close fit between the sleeves 20 and the tubular standard 5.

The arrangement is simple and embodies a relatively few number of parts and the operation of the lamps is positive, thereby assuring the rays of light being thrown upon the roadway in advance of the vehicle whether the same is traveling in a direct line or turning either to the right, or to the left, or negotiating a curve.

Having thus described the invention, we claim:

1. In a vehicle headlight, a pivotally mounted lamp, a sleeve forming part of the lamp stem and having slots in opposite sides opening downwardly through its lower end, a tubular standard pivotally mounted upon the chassis and having slots in opposite sides opening through its upper end, a rod having balls at opposite ends fitted within the said sleeve and standard and having trunnions entering the slots in the sides thereof, and an open helical spring within the standard yieldably supporting the rod and maintaining it in operative position.

2. In a vehicle headlight, lugs secured to the brace connecting the front fenders, lamps pivotally mounted in the lugs, arms projecting from the stems of the lamps and operating to prevent displacement of the lamps from the lugs, a link connection between the arms, a standard pivotally mounted upon the front axle, connecting means between the standard and the stem of a lamp and universally and yieldably coupled to each, an open helical spring supporting the connecting means, a pin pivotally and yieldably mounted upon the link connecting the steering arms, and a rod connected to the said standard and having sliding engagement with the said pin.

3. In a vehicle headlight, pivotally mounted lamps connected for synchronous movement, a sleeve projecting from one of the lamps in line with its axis, and having slots in opposite sides, a tubular standard pivotally mounted upon the axle and having slots in opposite sides, a pin pivotally and yieldably mounted upon the link connecting the steering arms, a rod connected with the said standard and having sliding engagement with the said pin, a rod provided at its ends with balls which are fitted within the said sleeve and standard, respectively, and having trunnions to enter the slots thereof, and a spring within the standard and exerting an endwise pressure upon the ball therein.

In testimony whereof we affix our signatures.

SAM MOORE. [L. S.]
FRED O. SHEETS. [L. S.]